US012769916B2

(12) United States Patent
Gonthier et al.

(10) Patent No.: US 12,769,916 B2
(45) Date of Patent: Oct. 20, 2026

(54) NOISE MITIGATION THROUGH QUANTUM STATE PURIFICATION BY CLASSICAL ANSATZ TRAINING

(71) Applicant: Zapata Computing, Inc., Boston, MA (US)

(72) Inventors: Jérôme Florian Gonthier, Cambridge, MA (US); Jhonathan Romero, Somerville, MA (US)

(73) Assignee: Zapata Computing, Inc., Boston, MA (US)

(*) Notice: Subject to any disclaimer, the term of this patent is extended or adjusted under 35 U.S.C. 154(b) by 1281 days.

(21) Appl. No.: 17/324,384

(22) Filed: May 19, 2021

(65) Prior Publication Data

US 2021/0365622 A1 Nov. 25, 2021

Related U.S. Application Data

(60) Provisional application No. 63/028,834, filed on May 22, 2020.

(51) Int. Cl.
*G06F 119/10* (2020.01)
*G06F 30/367* (2020.01)
(Continued)

(52) U.S. Cl.
CPC ........... *G06F 30/367* (2020.01); *G06N 10/20* (2022.01); *G06N 10/70* (2022.01); *G06F 2119/10* (2020.01)

(58) Field of Classification Search
CPC ............... G06F 30/367; G06F 2119/10; G06N 10/20; G06N 10/70; G06N 10/40
See application file for complete search history.

(56) References Cited

U.S. PATENT DOCUMENTS

| | | | |
|---|---|---|---|
| 7,353,148 | B1 | 4/2008 | Meyers |
| 10,044,638 | B2 | 8/2018 | Dadashikelayeh |

(Continued)

FOREIGN PATENT DOCUMENTS

| | | |
|---|---|---|
| CA | 3151055 C | 8/2022 |
| CA | 3133917 C | 3/2023 |

(Continued)

OTHER PUBLICATIONS

European Search Opinion for EP 21809125, EPO, May 24, 2024, pp. 1-5. (Year: 2024).*

(Continued)

*Primary Examiner* — Nghia M Doan
(74) *Attorney, Agent, or Firm* — Young Basile Hanlon & MacFarlane, P.C.

(57) ABSTRACT

A computer-implemented method produces a representation of a pure quantum state from a classical model. The classical model has a plurality of parameters. The method includes: (A) selecting a set of outcomes from a library of outcomes of a quantum circuit, wherein the library of outcomes comprises a plurality of measurement pairs sampled from the quantum circuit, each measurement pair comprising a quantum measurement and a corresponding measurement basis; and (B) updating values of the plurality of parameters of the classical model to minimize a value of a distance measure between the classical model and the set of outcomes, thereby producing the updated classical model, wherein the updated classical model has the updated values of the plurality of parameters.

26 Claims, 5 Drawing Sheets

(51) Int. Cl.

| | |
|---|---|
| ***G06N 3/09*** | (2023.01) |
| ***G06N 10/20*** | (2022.01) |
| ***G06N 10/40*** | (2022.01) |
| ***G06N 10/70*** | (2022.01) |

(56) References Cited

U.S. PATENT DOCUMENTS

| | | | |
|---|---|---|---|
| 10,325,218 | B1 * | 6/2019 | Zeng .................. G01R 31/3177 |
| 10,469,087 | B1 | 11/2019 | Granade et al. |
| 10,832,155 | B2 | 11/2020 | Lechner et al. |
| 10,922,460 | B1 | 2/2021 | Lee et al. |
| 10,949,768 | B1 | 3/2021 | Zeng |
| 10,984,152 | B2 * | 4/2021 | Rubin ..................... G06F 30/20 |
| 11,157,827 | B2 | 10/2021 | Sim |
| 11,574,227 | B2 * | 2/2023 | Kim ........................ G06F 17/18 |
| 11,615,329 | B2 | 3/2023 | Wang et al. |
| 2007/0239366 | A1 | 10/2007 | Hilton |
| 2010/0306142 | A1 | 12/2010 | Amin |
| 2016/0004972 | A1 | 1/2016 | Alboszta et al. |
| 2016/0042294 | A1 | 2/2016 | Macready |
| 2017/0177782 | A1 | 6/2017 | Hastings |
| 2017/0351967 | A1 | 12/2017 | Babbush |
| 2017/0357539 | A1 | 12/2017 | Dadashikelayeh |
| 2017/0364796 | A1 | 12/2017 | Wiebe |
| 2018/0129965 | A1 | 5/2018 | Bocharov |
| 2018/0232649 | A1 | 8/2018 | Wiebe |
| 2018/0246851 | A1 | 8/2018 | Zaribafiyan |
| 2018/0322408 | A1 | 11/2018 | Chen |
| 2019/0164079 | A1 | 5/2019 | Gambetta |
| 2019/0251466 | A1 | 8/2019 | Mezzacapo |
| 2020/0005186 | A1 | 1/2020 | Romero et al. |
| 2020/0097848 | A1 | 3/2020 | Woerner et al. |
| 2020/0117702 | A1 | 4/2020 | Babbush |
| 2020/0134502 | A1 | 4/2020 | Anschuetz |
| 2020/0151073 | A1 | 5/2020 | Kelly |
| 2020/0226487 | A1 | 7/2020 | Radin et al. |
| 2020/0274554 | A1 | 8/2020 | Aspuru-Guzik et al. |
| 2020/0334107 | A1 | 10/2020 | Katabarwa |
| 2020/0394549 | A1 | 12/2020 | Dallaire-Demers |
| 2021/0133617 | A1 | 5/2021 | Sim |
| 2021/0182726 | A1 | 6/2021 | Harry Putra |
| 2021/0232963 | A1 | 7/2021 | Gimeno-Segovia et al. |
| 2021/0271731 | A1 | 9/2021 | Stobinska et al. |
| 2021/0312313 | A1 | 10/2021 | Woerner |
| 2022/0188679 | A1 | 6/2022 | Mazzola |
| 2022/0284337 | A1 | 9/2022 | Radin et al. |
| 2022/0292385 | A1 | 9/2022 | Sauvage |
| 2022/0335325 | A1 | 10/2022 | Dallaire-Demers |
| 2023/0081927 | A1 | 3/2023 | Zhang |

FOREIGN PATENT DOCUMENTS

| | | | |
|---|---|---|---|
| CN | 114223003 | A | 3/2022 |
| EP | 3983961 | A1 | 4/2022 |
| EP | 4022530 | A1 | 7/2022 |
| EP | 4026066 | A1 | 7/2022 |
| EP | 4042338 | A1 | 8/2022 |
| EP | 4052194 | | 9/2022 |
| EP | 4154193 | A1 | 3/2023 |
| JP | 7223174 | B2 | 2/2023 |
| KR | 20160132943 | A | 11/2016 |
| TW | 201723935 | A | 7/2017 |
| TW | I764348 | B | 5/2022 |
| WO | 2015069625 | A1 | 5/2015 |
| WO | 2017001404 | A1 | 1/2017 |
| WO | 2017027185 | A1 | 2/2017 |
| WO | 2018064535 | A1 | 4/2018 |
| WO | 2018212789 | A1 | 11/2018 |
| WO | 2019050555 | A1 | 3/2019 |
| WO | 2019055843 | A1 | 3/2019 |
| WO | 2019104443 | A1 | 6/2019 |
| WO | 2019126644 | A1 | 6/2019 |
| WO | 2019150090 | A1 | 8/2019 |
| WO | 2019220122 | A1 | 11/2019 |
| WO | 2020168158 | A1 | 8/2020 |
| WO | 2020214910 | A1 | 10/2020 |
| WO | 2021087206 | A1 | 5/2021 |
| WO | 2021236725 | A1 | 11/2021 |
| WO | 2022087143 | A1 | 4/2022 |
| WO | 2022187503 | A1 | 9/2022 |
| WO | 2022192525 | A1 | 9/2022 |
| WO | 2023043996 | A1 | 3/2023 |

OTHER PUBLICATIONS

EPO document (Year: 2024).*

Official Action mailed Sep. 29, 2022, in Canadian patent application No. 3,157,270, 5 pages.

Anirban Narayan Chowdhury et al., "Improved implementation of reflection operators", researchgate.net, Mar. 6, 2018, 12 pages. Available online at https://www.researchgate.net/publication/323627065_Improved_implementation_of_reflection_operators.

Extended European Search Report mailed Sep. 20, 2022, in European patent application No. 20738886.9, 10 pages.

A. Shabani et al., "Efficient measurement of quantum dynamics via compressive sensing," arxiv.org, Cornell University Library, 201 Olin Library Cornell University Ithaca, NY 14853, Oct. 28, 2009, XP080374481, DOI: 10.1103/PHYSREVLETT.106.100401, 9 pages.

M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.

First Examination Report mailed Oct. 28, 2022, in Australian patent application No. 2020292425, 3 pages.

Official Action mailed May 16, 2023, in Canadian patent application No. 3,157,270, 4 pages.

Torlai, G., et al., "Neural-Network Quantum State Tomography", Nature Physics, vol. 14, No. 5, pp. 1-6 (Feb. 2018).

Cramer, M., et al., "Efficient Quantum State Tomography", Nature communications, 1(1), pp. 1-7 (Dec. 21, 2010).

International Search Report & Written Opinion mailed Jan. 5, 2021, in international patent application No. PCT/US2020/052958, 7 pages.

Maslov, D., "Basic Circuit Compilation Techniques for an Ion-Trap Quantum Machine", https://arxiv.org/pdf/1603.07678v4, pp. 1-18 (Feb. 21, 2017).

Sepiol, M.A., "A High-Fidelity Microwave Driven Two-Qubit Quantum Logic Gate in 43Ca+", pp. 1-197 (2016).

Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.

Pino, J.M., et al., "Demonstration of the QCCD trapped-ion quantum computer architecture", arXiv:2003.01293, pp. 1-11 (Sep. 26, 2020).

Kaushal, V., et al., "Shuttling-based trapped-ion quantum information processing", AVS Quantum Science, vol. 2, No. 1, pp. 1-25 (2020).

International Search Report & Written Opinion mailed Dec. 11, 2020, in international patent application No. PCT/US2020/049605, 14 pages.

International Search Report & Written Opinion mailed Feb. 18, 2021, in international patent application No. PCT/US2020/058119, 7 pages.

Sunkin Sim et al., "Expressibility and Entangling Capability of Parameterized Quantum Circuits for Hybrid Quantum-Classical Algorithms", arXiv: 1905.10876v1, May 25, 2019, 18 pages. Available online at <URL: https://arxiv.org/abs/1905.10876v1.pdf>.

Andersen, C.K., et al., "Entanglement Stabilization using Parity Detection and Real-Time Feedback in Superconducting Circuits", arXiv:1902.06946v2, pp. 1-12 (Feb. 20, 2019).

Cao, Y., et al., "Implementation of a Toffoli gate using an array of coupled cavities in a single step", Scientific Reports, vol. 8, Article No. 5813, pp. 1-10 (Apr. 11, 2018).

Wecker, D., et al., "Solving strongly correlated electron models on a quantum computer", Physical Review A, vol. 92, No. 6, pp. 1-27 (2015).

(56) References Cited

OTHER PUBLICATIONS

Baekkegaard, T., et al., "Realization of efficient quantum gates with a superconducting qubit-qutrit circuit", Scientific Reports, vol. 9, Article No. 13389, pp. 1-10 (Sep. 16, 2019).
International Search Report and Written Opinion mailed Mar. 15, 2021, in International Patent Application No. PCT/US2020/061631, 7 pages.
First Office Action mailed May 14, 2021, in Taiwan patent application No. 109139876, 9 pages (English translation Included).
Non-Final Office Action mailed Jun. 10, 2021, in U.S. Appl. No. 17/084,990 of Sukin Sim, filed Oct. 30, 2020, 20 pages.
Notice of Allowance mailed Jun. 28, 2021, for U.S. Appl. No. 17/033,727 of Pierre-Luc Dallaire-Demers, filed Sep. 26, 2020, 32 pages.
Notice of Allowance mailed Aug. 12, 2021, in U.S. Appl. No. 17/084,990 of Sukin Sim, filed Oct. 30, 2020, 5 pages.
Notice of Allowance mailed Aug. 27, 2021, in U.S. Appl. No. 17/084,990 of Sukin Sim, filed Oct. 30, 2020, 5 pages.
Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).
Norm M. Tubman, et al., "Postponing the Orthogonality Catastrophe: Efficient State Preparation for Electronic Structure Simulations on Quantum Devices," Quantum Physics, arXiv:1809.05523, pp. 1-13, Sep. 14, 2018.
Tzu-Ching Yen, et al., "Measuring all Compatible Operators in One Series of Single-Qubit Measurements Using Unitary Transformations," Journal of Chemical Theory and Computation, 16(4):2400-2409, 2020. arXiv:1907.09386.
Panagiotis KI Barkoutsos et al., "Quantum Algorithms for Electronic Structure Calculations: Particle-Hole Hamiltonian and Optimized Wave-Function Expansions," Phys. Rev. A 98, 022322, Aug. 20, 2018, 14 pages.
Eddins, A., et al., "Doubling the Size of Quantum Simulators by Entanglement Forging," Quantum Physics, arXiv:2104.10220, pp. 1-17 (Apr. 20, 2021).
R. L. Fox et al., "Rates of change of eigenvalues and eigenvectors," AIAA Journal 6.12 (1968), pp. 2426-2429.
William M Kirby et al., "Classical simulation of noncontextual Pauli Hamiltonians," Physical Review A 102.3 (2020), p. 032418. arXiv:2002.05693.
William M Kirby et al., "Contextuality Test of the Nonclassicality of Variational Quantum Eigensolvers," Physical review letters 123. 20 (2019), p. 200501. arXiv:1904.02260.
William M Kirby et al., "Contextual Subspace Variational Quantum Eigensolver," Quantum 5 (2021), p. 456. https://quantum-journal.org/papers/q-2021-05-14-456/pdf/arXiv:2011.10027.
Kottmann, J.S., et al., "Reducing qubit requirements while maintaining numerical precision for the variational quantum eigensolver: A basis-set-free approach," The Journal of Physical Chemistry Letters 12.1, arXiv:2008.02819, pp. 663-673 (2021).
Kühn, M., et al. "Accuracy and Resource Estimations for Quantum Chemistry on a Near-Term Quantum Computer," Journal of Chemical Theory and Computation 15.9, pp. 1-26. arXiv: 1812.06814 (Aug. 14, 2019).
Manrique, D.Z., et al., "Momentum-Space Unitary Coupled Cluster and Translational Quantum Subspace Expansion for Periodic Systems on Quantum Computers," arXiv: 2008.08694 [quant-ph], pp. 1-10 (2021).
Mcclean, J.R., et al., "OpenFermion: the electronic structure package for quantum computers", Quantum Science and Technology 5.3, p. 034014, pp. 1-22 (2020).
Mcclean, J.R., et al., "Decoding quantum errors with subspace expansions," Nat. Comm. 11, p. 636. doi: 10.1038/s41467-020-14341—pp. 1-9 (2020).
Nakanishi, K.M., et al., "Subspace-search variational quantum eigensolver for excited states," Phys. Rev. Research 1, p. 033062. doi: 10.1103/PhysRevResearch.1.033062-1-7 (3 Oct. 3, 2019).
O'Gorman, B., et al., Generalized swap networks for near-term quantum computing, arXiv: 1905.05118 [quant-ph]., pp. 1-16 (May 13, 2019).
Robert M. Parrish et al. "Psi4 1.1: An Open-Source Electronic Structure Program Emphasizing Automation, Advanced Libraries, and Interoperability," J. Chem. Theory Comput. 13.7 (2017), pp. 3185-3197. doi: 10.1021/acs.jctc.7b00174. url: http://dx.doi.org/10.1021/acs.jctc.7b00174.
Robbins, K., and Love, P.J., "Benchmarking VQE with the LMG model," arXiv: 2105.06761 [quant-ph]. pp. 1-15 (Aug. 2, 2021).
Tyler Takeshita et al., "Increasing the Representation Accuracy of Quantum Simulations of Chemistry without Extra Quantum Resources," Phys. Rev. X 10 (Jan. 1, 2020), p. 011004. doi: 10.1103/PhysRevX.10.011004. url: https://link.aps.org/doi/10.1103/PhysRevX.10.011004.
Urbanek, M., et al., "Chemistry on Quantum Computers with Virtual Quantum Subspace Expansion," Journal of Chemical Theory and Computation 16.9, pp. 5425-5431. doi: 10.1021/acs.jctc.0c00447. (Feb. 28, 2020).
Wang, G., et al., "Minimizing Estimation Runtime on Noisy Quantum Computers," PRX Quantum 2.1 pp. 010346-1-49 (2021).
Grant, E., et al., "An initialization strategy for addressing barren plateaus in parametrized quantum circuits," Quantum 3, 214, pp. 1-9 (Nov. 28, 2019).
Grimsley, H.R., et al., "An adaptive variational algorithm for exact molecular simulations on a quantum computer," Nature Communications 10, 3007, pp. 1-9 (2019).
Verdon, G., et al., "Learning to learn with quantum neural networks via classical neural networks," arXiv:1907.05415, pp. 1-12 (Jul. 11, 2019).
Wilson, M., et al., "Optimizing quantum heuristics with meta-learning," arXiv: 1908.03185, pp. 1-13 (Aug. 8, 2019).
Skolik, A., et al., "Layerwise learning for quantum neural networks," arXiv:2006.14904, vol. 3, No. 5 pp. 1-11 (Jun. 26, 2020).
Finn, C., and Levine, S., "Meta-learning and universality: Deep representations and gradient descent can approximate any learning algorithm," arXiv:1710.11622, pp. 1-20 (Feb. 14, 2018).
Cervera-Lierta, A., et al., "The meta-variational quantum eigensolver (meta-vqe): Learning energy profiles of parameterized hamiltonians for quantum simulation," arXiv:2009.13545, pp. 1-11 (May 28, 2020).
Zhenguo Li et al., "Meta-sgd: Learning to learn quickly for few-shot learning," arXiv preprint arXiv:1707.09835, Sep. 28, 2017, 11 pages.
Nichol, A., et al., "On first-order metal-earning algorithms," arXiv: 1803.02999, pp. 1-15 (Oct. 22, 2018).
Rusu, A. A., et al., "Meta-learning with latent embedding optimization," arXiv:1807.05960, pp. 1-17 (Mar. 26, 2019).
Andersen, C.K., et al., "Entanglement stabilization using ancilla-based parity detection and real-time feedback in superconducting circuits," npj Quantum Information, vol. 5, No. 1, pp. 1-7 pages, XP055810501, DOI: 10.1038/s41534-019-0185-4 (Dec. 1, 2019).
Azad, U., and Singh, H., "Quantum Chemistry Calculations using Energy Derivatives on Quantum Computers," arXiv:2106.06463v1. pp. 1-12 (Jun. 10, 2021) [retrieved on Jan. 3, 2023]. Retrieved from <URL: https://arxiv.org/pdf/2106.06463.pdf>.
Bækkegaard, T., et al., "Realization of efficient quantum gates with a superconducting qubit-qutrit circuit," arXiv.org, Cornell University Library, 201 Olin Library Cornell University Ithaca, NY 14853, Feb. 12, 2018, 27 pages, XP081554230, DOI: 10.1038/s41598-019-49657-1.
Cai, X., et al., "Quantum computation of molecular response properties," Physical Review Research, pp. 1-7 (Aug. 27, 2020).
Decision to Grant mailed Jan. 17, 2023, in Japanese patent application No. 2021-571623, 5 pages.
Endo, S., et al., "Hybrid Quantum-Classical Algorithms and Quantum Error Mitigation," Journal of the Physical Society of Japan 90, pp. 1-33 (Feb. 1, 2021).
Extended European Search Report mailed Dec. 22, 2022, in European patent application No. 20890215.5, 10 pages.
Extended European Search Report mailed Jan. 12, 2023, in European Patent Application No. 20882002.7, 10 pages.

(56) References Cited

OTHER PUBLICATIONS

Extended European Search Report mailed Oct. 27, 2022, in European patent application No. 20868114.8, 10 pages.
First Office Action mailed Dec. 29, 2022, in Canadian patent application No. 3,141,547, 4 pages.
International Search Report and Written Opinion mailed Jan. 5, 2023, in international patent application No. PCT/US2022/043793, 8 pages.
Jansen, K., and Hartung, T., "Zeta-regularized vacuum expectation values from quantum computing simulations," arXiv:1912.01276v1. pp 1-14. (Dec. 3, 2019) [retrieved on Jan. 3, 2023]. Retrieved from <URL: https://arxiv.org/pdf/1912.01276.pdf>.
Liu, Z., et al., "Some ground-state expectation values for the free parafermion Z(N) spin chain," arXiv:1905.08384v3. pp. 1-17 (Oct. 14, 2019) [retrieved on Jan. 3, 2023]. Retrieved from <URL: https://arxiv.org/pdf/1905.08384.pdf>.
Mcardle, S., et al., "Quantum computational chemistry," arxiv.org, Cornell University Library, 201 Olin Library Cornell University Ithaca, NY 14853, pp. 1-59 XP081585393 (Aug. 30, 2018).
Non-Final Office Action mailed Dec. 6, 2022, in U.S. Appl. No. 16/543,165 of Peter D. Johnson, filed Aug. 16, 2019, 23 pages.
Non-Final Office Action mailed Dec. 8, 2022 for U.S. Appl. No. 16/740,177, of Maxwell D. Radin, filed Jan. 10, 2020, 85 pages.
Notice of Allowance mailed Dec. 22, 2022, in U.S. Appl. No. 16/900,947 of Guoming Wang, filed Jun. 14, 2020, 32 pages.
Notice of Allowance mailed Jan. 19, 2023, in Canadian patent application No. 3,133,917, 1 page.
Notice of Allowance mailed Mar. 30, 2023, in Canadian patent application No. 3,155,085, 1 page.
Pranav Gokhale et al., "Partial Compilation of Variational Algorithms for Noisy Intermediate-Scale Quantum Machines," MICRO-52, Oct. 12-16, 2019, Columbus, OH, USA, 13 pages. XP 58476958A. Available online at <https://doi.org/10.1145.3352460.3358313>.
Ryan Babbush et al., "Low Depth Quantum Simulation of Electronic Structure," Phys. Rev. X 8, 011044 (2018) 37 pages. Available online at <https://arxiv.org/pdf/1706.00023v2.pdf>.
Second Office Action mailed Apr. 6, 2022, in Taiwan patent application No. 109139876, 3 pages (English translation included).
Notice of Allowance mailed May 18, 2022, in Canadian patent application No. 3,151,055, 1 page.
"Quantum Computing: Progress and Prospects" National Academies of Sciences, Engineering, and Medicine, pp. 1-273 (2019).
Benedetti, M., et al., "Parameterized quantum circuits as machine learning models," arXiv: 1906.07682v2, pp. 1-18 (Oct. 10, 2019). Available online at <https://arxiv.org/abs/1906.07682v2>.
Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).
Dyakonov, M., "The case against Quantum Computing", IEEE Spectrum, pp. 1-5 (Nov. 15, 2018).
Endo, S., et al., "Hybrid quantum-classical algorithms and quantum error mitigation," arXiv.2011.01382v1, pp. 1-39 (Nov. 2, 2020) Available online at [https://arxiv.org/abs/2011.01382].
Extended European Search Report mailed Jun. 22, 2022, in European patent application No. 20791186.8, 8 pages.
Extended European Search Report mailed May 19, 2022, in European patent application No. 19850377.3, 10 pages.
Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).
Horgan, J., "Will Quantum Computing Ever Live Up to Its Hype?", Quantum Computing, Scientific American, p. 6 (Apr. 20, 2021).
Huang, C., et al., "Classical Simulation of Quantum Supremacy Circuits," arXiv:2005.06787v1., pp. 1-28 (May 14, 2020) Available online at [https://arxiv.org/abs/2005.06787].
International Search Report & Written Opinion mailed Jun. 15, 2022, in international patent application No. PCT/US2022/018727, 9 pages.
International Search Report & Written Opinion mailed Jun. 28, 2022, in international patent application No. PCT/US2022/019724, 9 pages.
Johnson, P.D., et al., "QVECTOR: an algorithm for device-tailored quantum error correction," pp. 1-16, XP055553548, (Nov. 7, 2017) Retrieved from the Internet at <URL:https://arxiv.org/pdf/1711.02249.pdf.
Moll, N., et al., "Quantum optimization using variational algorithms on near-term quantum devices," Quantum Science and Technology, vol. 3, p. 18 (Jun. 19, 2018) [retrieved on Nov. 25, 2019]. Retrieved from <https://iopscience.iop.org/article/10.1088/2058-9565/aab822/pdf>.
Non-Final Office Action mailed May 11, 2022, in U.S. Appl. No. 16/543,165 of Peter D. Johnson, filed Aug. 16, 2019, 26 pages.
Preskill, J., "Quantum Computing in the NISQ era and beyond", pp. 1-20 (Jul. 31, 2018).
Sauvage, F., et al., "Flip: A flexible initializer for arbitrarily-sized parametrized quantum circuits," https://arxiv.org/abs/2103.08572v2, 15 pages, (May 5, 2021).
Xia, R., and Kais, S., "Hybrid Quantum-Classical Neural Network for Calculating Ground State Energies of Molecules," Entropy, vol. 22, No. 8, pp. 1-12 (Jul. 29, 2020) Available online at [https://doi.org/10.3390/e22080828].
Amaro, D., et al., "Filtering variational quantum algorithms for combinatorial optimization," arXiv preprint arXiv:2106.10055, pp. 1-14 (Feb. 10, 2022).
Babbush, R., et al., "Encoding Electronic Spectra in Quantum Circuits with Linear T Complexity," Physical Review X, vol. 8, No. 4, 041015, pp. 1-39 (Sep. 19, 2018).
Bonet-Monroig, X., et al., "Performance comparison of optimization methods on variational quantum algorithms," arXiv preprint arXiv:2111.13454, pp. 1-12 (Dec. 14, 2021).
Childs, A. M. et al., "Hamiltonian simulation using linear combinations of unitary operations", Quantum Information and Computation, vol. 12, pp. 901-924 (2012).
Decision of Grant mailed Jan. 20, 2022, in Taiwan patent application No. 109137856, 5 pages.
First Office Action mailed Oct. 8, 2021, in Taiwan patent application No. 109137856, 5 pages.
He, M., et al., "Quantum Gaussian filter for exploring ground-state properties," arXiv preprint arXiv:2112.06026, pp. 1-7 (Dec. 11, 2021).
Higgott, O., et al., "Variational Quantum Computation of Excited States," Quantum, vol. 3, pp. 1-11 (Jun. 28, 2019).
International Search Report and Written Opinion mailed Feb. 4, 2022, in International Patent Application No. PCT/US2021/055867, 6 pages.
Kassal, I., et al., "Polynomial-time quantum algorithm for the simulation of chemical dynamics," Proceedings of the National Academy of Sciences, vol. 105, No. 48, pp. 1-6 (2008).
Kitaev, A.Y., et al., "Classical and quantum computation," Graduate Studies in Mathematics, vol. 47, 2002, 24 pages. Editorial Committee: Steven G. Krantz, David Saltman, David Sattinger and Ronald Stern, American Mathematical Society; Providence, Rhode Island, United States of America.
Kottmann, J.S., et al., "Reducing Qubit Requirements while Maintaining Numerical Precision for the Variational Quantum Eigensolver: A Basis-Set-Free Approach," The Journal of Physical Chemistry Letters, vol. 12, No. 1, pp. 1-13 (Dec. 31, 2020).
Kyriienko, O., "Quantum inverse iteration algorithm for programmable quantum simulators," arXiv preprint arXiv: 1901.09988, pp. 1-16 (Sep. 30, 2019).
Mcardle, S., et al., "Variational ansatz-based quantum simulation of imaginary time evolution," Nature Partner Journals: Quantum Information, vol. 5, No. 1, pp. 1-6 (2019).
Mcclean, J.R., et al., "Barren plateaus in quantum neural network training landscapes," Nature communications, arXiv:1803.11173, pp. 1-6 (2018).
Mcclean, J.R., et al., "The theory of variational hybrid quantum-classical algorithms," New Journal of Physics, vol. 18, No. 2, arXiv: 1509.04279, pp. 1-20 (Sep. 14, 2015).

(56) References Cited

OTHER PUBLICATIONS

Motta, M., et al., "Determining eigenstates and thermal states on a quantum computer using quantum imaginary time evolution," Nature Physics, vol. 16, No. 2, pp. 1-18 (Feb. 16, 2020).
Parrish, R.M., et al., "Quantum Computation of Electronic Transitions Using a Variational Quantum Eigensolver," Physical Review Letters, vol. 122, No. 23, pp. 1-13 (Apr. 10, 2019).
Poulin, D., and Wocjan, P., "Preparing ground states of quantum many-body systems on a quantum computer," Physical review letters, vol. 102, No. 13, 130503, pp. 1-7 (Sep. 16, 2008).
Yoder, T.J., et al., "Fixed-point quantum search with an optimal number of queries," Physical review letters, vol. 113, No. 21, p. 210501-5 (Nov. 21, 2014).
Barenco, A., et al., "Elementary Gates for Quantum Computation", arXiv:quant-ph/9503016v1, Mar. 23, 1995, pp. 1-31.
Ferrie, C., et al., "How to Best Sample a Periodic Probability Distribution, or on the Accuracy of Hamiltonian Finding Strategies", Quantum Information Processing, arXiv:1110.3067v1, pp. 1-8 (Oct. 13, 2011).
Kitaev, A.Y., "Quantum Measurements and the Abelian Stabilizer Problem", arXiv preprint quant-ph/9511026, pp. 1-22 (Nov. 20, 1995).
Knill, E., et al., "Optimal Quantum Measurements of Expectation Values of Observables", arXiv quant-ph/0607019v1, pp. 1-22 (Jul. 3, 2006).
Low, G.H., and Chuang, I.L., "Optimal Hamiltonian Simulation by Quantum Signal Processing", arXiv: 1606.02685v2, pp. 1-6 (Dec. 20, 2016).
Sergeevich, A., et al., "Characterization of a Qubit Hamiltonian Using Adaptive Measurements in a Fixed Basis", arXiv: 1102.3700v2, pp. 1-6 (Nov. 23, 2011).
Wang, D., et al., "Accelerated Variational Quantum Eigensolver", arXiv:1802.00171v3, pp. 1-11 (Mar. 25, 2019).
Wiebe, N., and Granade, C., "Efficient Bayesian Phase Estimation", arXiv:1508.00869v1, pp. 1-12 (Aug. 4, 2015).
Colless, J.I., et al., "Computation of Molecular Spectra on a Quantum Processor with an Error-Resilient Algorithm", Physical Review X, vol. 8, No. 1, pp. 011021-011027 (2018).
Baker, J.M., et al., "Decomposing Quantum Generalized Toffoli with an Arbitrary Number of Ancilla", arXiv: 1904.01671v1, pp. 1-10 (Apr. 2, 2019).
Fedorov, A., et al., "Implementation of a Toffoli Gate with Superconducting Circuits", arXiv:1108.3966v1, pp. 1-5 (Aug. 19, 2011).
Hoyer, P., et al., "On Arbitrary Phases in Quantum Amplitude Amplification", arXiv:quant-ph/0006031v1, pp. 1-6 (Jun. 7, 2000).
Krantz, P., et al., "A Quantum Engineer's Guide to Superconducting Qubits", Applied Physics Reviews, vol. 6, No. 2, 021318, pp. 1-59 (2019).
Long, G.L., et al., "Phase Matching in Quantum Searching", arXiv:quant-ph/9906020v1, pp. 1-13 (Jun. 5, 1999).
Low, G.H., et al., "Methodology of Resonant Equiangular Composite Quantum Gates", Physical Review X, vol. 6, No. 4, pp. 1-13 (2016).
Verstraete, F., et al., "Quantum Circuits for Strongly Correlated Quantum Systems", arXiv:0804.1888v1, pp. 1-5 (Apr. 11, 2008).
Peruzzo, A., et al., "A variational eigenvalue solver on a quantum processor", Quantum Physics, arXiv:1304.3061v1, pp. 1-10 (Apr. 10, 2013).
International Search Report & Written Opinion mailed May 11, 2020, in International Patent Application No. PCT/US2020/013181, 11 pages.
Rubin, N. C., et al., "Application of Fermionic Marginal Constraints to Hybrid Quantum Algorithms", New Journal of Physics, vol. 20, No. 5, 053020, pp. 1-21 (2018).
International Search Report & Written Opinion mailed Jul. 27, 2020, in international patent application No. PCT/US2020/028670, 7 pages.
Figgat, C., et al., "Complete 3-Qubit Grover search on a programmable quantum computer", Nature Communications, vol. 8, Article No. 1918, pp. 1-9 (2017).
Mølmer, K., and Sørensen, A., "Multiparticle entanglement of hot trapped ions", arXiv:quant-ph/9810040v2, pp. 1-4 (Jan. 26, 1999).
International Search Report and Written Opinion mailed Sep. 21, 2020, in international patent application No. PCT/US2020/037655, pp. 1-8.
Ghamami, S., and Zhang, B., et al., "Efficient Monte Carlo Counterparty Credit Risk Pricing and Measurement", Journal of Credit Risk, vol. 10, No. 3, pp. 1-42 (Jul. 23, 2014).
Rodriguez-Lujan, I., et al., "Quadratic Programming Feature Selection", The Journal of Machine Learning Research, vol. 11, pp. 1491-1516 (2010).
Bravyi, S., "Lagrangian Representation for Fermionic Linear Optics", arXiv:quant-ph/0404180v2, pp. 1-12 (Sep. 20, 2004).
Temme, K., et al., "Error Mitigation for Short-Depth Quantum Circuits", Physical review letters, vol. 119, No. 18, 180509, pp. 1-15 (2017).
Kjaergaard, M., et al., "Superconducting Qubits: Current State of Play", arXiv:1905.13641v2, pp. 1-28 (Jul. 26, 2019).
Nielsen, M.A., et al., "Quantum Computation as Geometry", arXiv:quant-ph/0603161v2, pp. 1-13 (Mar. 21, 2006).
Dallaire-Demers, P. L., et al., "An application benchmark for fermionic quantum simulations", arXiv:2003.01862v1, pp. 1-14 (Mar. 4, 2020).
Bedürftig, G., and Frahm, H., "Spectrum of boundary states in the open Hubbard chain", arXiv:cond-mat.9702227v1, pp. 1-14 (Feb. 26, 1997).
Essler, F. H. L., et al., "The one-dimensional Hubbard model", Cambridge University Press, pp. 1-753. (Dec. 11, 2003).
Potthoff, M., "Chapter 1: Self-energy-functional theory", arXiv:1108.2183, pp. 1-38 (Aug. 10, 2011).
Manby, F.R., et al., "A simple, exact density-functional-theory embedding scheme", Journal of Chemical Theory and Computation, 8 (8), pp. 2564-2568 (Jul. 17, 2012).
Bao, N., et al., "Universal Quantum Computation by Scattering in the Fermi-Hubbard model", arXiv:1409.3585v2, pp. 1-9 (Sep. 15, 2014).
Lee, S.J.R., et al., "Analytical Gradients for Projection-Based Wavefunction-in-DFT Embedding", arXiv: 1903.05830v3, pp. 1-15 (Aug. 19, 2019).
Arute, F., et al., "Quantum supremacy using a programmable superconducting processor", Nature, vol. 574, pp. 505-510 (Oct. 23, 2019).
Wecker, D., et al., "Towards Practical Quantum Variational Algorithms", Physical Review A, vol. 92, No. 4, 042303, pp. 1-11 (2015).
Wang, G., et al., "Bayesian Inference with Engineered Likelihood Functions for Robust Amplitude Estimation", arXiv:2006.09350v2, pp. 1-62 (Jun. 26, 2020).
Jones T., and Benjamin S. C., et al., "Quantum compilation and circuit optimisation via energy dissipation", arXiv: 1811.03147, pp. 1-13 (Dec. 19, 2018).
Mostafa H., and Wang X., et al., "Parameter Efficient Training of Deep Convolutional Neural Networks by Dynamic Sparse Reparameterization", arXiv:1902.05967v3, pp. 1-18 (May 13, 2019).
International Search Report & Written Opinion mailed Nov. 6, 2020, in international patent application No. PCT/US2020/044615, 8 pages.
Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).
Barenco, A., et al., "Elementary Gates for Quantum Computation", Physical review A, vol. 52, Issue No. 5, pp. 1-31 (Mar. 23, 1995).
Grover, L.K., "A fast quantum mechanical algorithm for database search," arXiv preprint quant-ph/9605043, pp. 1-8 (May 1996).
Knill, E., et al., "Optimal Quantum Measurements of Expectation Values of Observables," Physical Review A, 7(1), , p. 012328, pp. 1-22 (Jul. 3, 2006).
Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).
Dallaire-Demers, P.L., et al., "Quantum Generative Adversarial Networks," Physical Review A, vol. 98, No. 1, p. 012324, pp. 1-10 (Apr. 30, 2018).

(56) References Cited

OTHER PUBLICATIONS

Esslinger, T., "Fermi-Hubbard physics with atoms in an optical lattice", arXiv: 1007.0012v1, pp. 1-29 (Jun. 30, 2010).

Extended European Search Report issued in App. No. EP21809125, dated May 24, 2024, 9 pages.

R. Sagastizabal: "Experimental error mitigation via symmetry verification in a variational quantum eigensolver", Physical Review A, [Online] vol. 100, No. 1, Jul. 31, 2019 (Jul. 31, 2019), XP093162243, ISSN: 2469-9926, DOI: 10.1103/PhysRevA.100.010302 Retrieved from the Internet: URL:https://journals.aps.org/pra/pdf/10.1103/PhysRevA.100.010302> [retrieved on May 14, 2024].

Zhenyu Cai: "Resource Estimation for Quantum Variational Simulations of the Hubbard Model: The Advantage of Multi-core NISQ Processing", arxiv.org, Cornell University Library, 201 Olin Library Cornell University Ithaca, NY 14853, Oct. 7, 2019 (Oct. 7, 2019), XP081511562.

Gentini, L., et al., "Noise-Assisted Variational Hybrid Quantum-Classical Optimization", arXiv:1912.06744, pp. 1-8 (Dec. 13, 2019).

International Search Report & Written Opinion mailed Sep. 6, 2021, in international patent application PCT/US2021/033089, 8 pages.

Swarnadeep Majumder et al., "Real-time calibration with spectator qubits", npj Quantum Information, vol. 6, Retrieved from: <URL: https://www.nature.com/articles/s41534-020-0251-y>, Feb. 7, 2020, 9 pages.

Peruzzo, A., et al., "A variational eigenvalue solver on a photonic quantum processor", Nature Communications, vol. 5, Article No. 4213, pp. 1-7 (2014).

Crawford, O., et al., "Efficient quantum measurement of Pauli operators in the presence of finite sampling error", Quantum Physics, arXiv:1908.06942v2, pp. 1-17 (Apr. 21, 2020).

Zhao, A., et al., "Measurement reduction in variational quantum algorithms", Quantum Physics, arXiv:1908.08067v2, pp. 1-21 (Dec. 16, 2019).

Kandala, A., et al., "Hardware-efficient variational quantum eigensolver for small molecules and quantum magnets", Nature 549, pp. 1-24 (Oct. 13, 2017).

Gokhale, P., and Chong, F.T., "O(N3) Measurement Cost for Variational Quantum Eigensolver on Molecular Hamiltonians", arXiv: 1908.11857v1, pp. 1-5 (Aug. 30, 2019).

Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).

Cao, Y., et al., "Quantum Chemistry in the Age of Quantum Computing", Quantum Physics, arXiv:1812.09976v2, pp. 1-194 (Dec. 28, 2018).

Verteletskyi, V., et al., "Measurement optimization in the variational quantum eigensolver using a minimum clique cover", Quantum Physics, arXiv:1907.03358v4, pp. 1-7 (Mar. 26, 2020).

Izmaylov, A. F., et al., "Unitary Partitioning Approach to the Measurement Problem in the Variational Quantum Eigensolver Method", Quantum Physics, arXiv:1907.09040v2, pp. 1-7 (Oct. 18, 2019).

Farhi, E., et al., "A quantum approximate optimization algorithm", Quantum Physics, arXiv: 1411.4028v1, pp. 1-16 (Nov. 14, 2014).

Johnson, P. D., et al., "QVECTOR: an algorithm for device-tailored quantum error correction", arXiv preprint arXiv: 1711.02249v1, pp. 1-16 (Nov. 7, 2017).

Schuld, M., et al., "Circuit-centric quantum classifiers", arXiv:1804.00633v1, pp. 1-17 (Apr. 2, 2018).

Purvis, G.D., et al., "A full coupled-cluster singles and doubles model: The inclusion of disconnected triples", The Journal of Chemical Physics, vol. 76, No. 4, pp. 1910-1918 (Feb. 15, 1982).

Benedetti, M., et al., "A generative modeling approach for benchmarking and training shallow quantum circuits", arXiv preprint arXiv:1801.07686v4, pp. 1-16 (Jun. 2, 2019).

Liu, J., and Wang, L., "Differentiable learning of quantum circuit Born machines", Phys. Rev. A 98, 062324, pp. 1-9 (2018).

Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).

Handy, N.C., et al., "Size-consistent Brueckner theory limited to double substitutions", Chemical Physics Letters, vol. 164, No. 2-3, pp. 185-192 (Dec. 8, 1989).

Dallaire-Demers, P.L., and Killoran, N., "Quantum generative adversarial networks", arXiv:1804.08641v2, Phys. Rev. A, vol. 98, 012324, pp. 1-10 (Apr. 30, 2018).

Liu, Y., et al., "Quantum computational complexity of the N-representability problem: QMA complete", Physical review letters, vol. 98, No. 11, pp. 1-6 (2007).

Wecker, D., et al., "Progress towards practical quantum variational algorithms", Phys. Rev. A 92, 042303, pp. 1-11 (2015).

Kandala, A., et al., "Hardware-efficient Variational Quantum Eigensolver for Small Molecules and Quantum Magnets", Nature, vol. 549, pp. 1-24 (2017).

Liu, Y., "The Complexity of the Consistency and N-Representability Problems for Quantum States", Quantum Physics, arXiv preprint arXiv:0712.3041, pp. 1-89 (2007).

Aspuru-Guzik, A., et al., "Simulated Quantum Computation of Molecular Energies", Science, Quantum Physics, vol. 309, No. 5741, pp. 1-21 (Sep. 9, 2005).

Harrow, A. W., et al., "Quantum algorithm for linear systems of equations", Phys. Rev. Lett., vol. 103, No. 15, 1-15 (2009).

Childs, A. M., et al., "Quantum algorithm for systems of linear equations with exponentially improved dependence on precision", arXiv:1511.02306v2, pp. 1-31 (2017).

Endo, S., et al., "Variational quantum algorithms for discovering Hamiltonian spectra", Physical Review A, arXiv preprint arXiv:1806.05707, pp. 1-9 (2018).

Nielsen, M. A., and Chuang, I. L., "Quantum Computation and Quantum Information", Cambridge University Press, pp. 1-704 (2000).

Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).

Bogoljubov, N.N., "A New Method in the Theory of Superconductivity", Soviet Physics JETP, vol. 34, No. 7, pp. 41-46 (Jul. 1958).

Bookatz, A. D., et al., "Error Suppression in Hamiltonian Based Quantum Computation Using Energy Penalties", arXiv: 1407.1485v1, pp. 1-26 (Jul. 6, 2014).

Wiebe, N., et al., "Higher Order Decompositions of Ordered Operator Exponentials", Mathematical Physics, arXiv:0812.0562v3, pp. 1-16 (Dec. 4, 2008).

Brassard, G., et al., "Quantum Amplitude Amplification and Estimation", arXiv:quant-ph/0005055v1, pp. 1-22 (May 15, 2000).

Bach, V., et al., "Generalized Hartree-Fock Theory and the Hubbard Model", Journal of Statistical Physics, vol. 76 (1-2):3-89, pp. 1-68 (Nov. 25, 1993).

Grover, L.K., "A fast quantum mechanical algorithm for database search", STOC '96: Proceedings of the twenty-eighth annual ACM symposium on Theory of Computing, pp. 1-8 (Jul. 1996).

Bravyi, L. D., et al., "Fermionic Quantum Computation", Annals of Physics, vol. 298, No. 1, pp. 210-226 (2002).

Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).

Helgaker T. et al., "Molecular Electronic-Structure Theory", Book published by John Wiley & Sons, pp. 1-908 (2000).

Dumitrescu, E., et al., "Tensor Network Benchmarking for Quantum Computing", Beyond CMOS Computing Workshop: The Interconnect Challenge, Session 1, Talk 4, pp. 1-25 (2017).

Zhukov, A. A., et al., "Quantum communication protocols as a benchmark for quantum computers", arXiv: 1812.00587v1, pp. 1-25 (Dec. 3, 2018).

Michielsen, K., et al., "Benchmarking gate-based quantum computers", Quantum Physics, arXiv:1706.04341, vol. 220 pp. 1-33 (Jun. 14, 2017).

Bishop, L., et al., "Quantum Volume", Technical report, IBM T.J. Watson, pp. 1-5 (Mar. 4, 2017).

(56) References Cited

OTHER PUBLICATIONS

Wootton, J. R., "Benchmarking of quantum processors with random circuits", arXiv: Quantum Physics, arXiv:1806.02736v1, pp. 1-15 (Jun. 7, 2018).
Heya, K., et al., "Variational Quantum Gate Optimization", Quantum Physics, arXiv:1810.12745v1, pp. 1-10 (Oct. 30, 2018).
Steane, A., "Multiple Particle Interference and Quantum Error Correction", Proceedings of The Royal Society A, The royal Society, vol. 452, Issue. 1954, pp. 2551-2577 (Nov. 8, 1996).
Mcclean, J.R., et al., "Hybrid Quantum-Classical Hierarchy for Mitigation of Decoherence and Determination of Excited States", Physical Review A, vol. 95, No. 4, pp. 1-10 (2017).
Nelder, J. A., and Mead, R., "A simplex method for function minimization", The Computer Journal, vol. 7, Issue. 4, pp. 308-313 (Jan. 1965).
Powell, M. J. D., "A Direct Search Optimization Method That Models the Objective and Constraint Functions by Linear Interpolation", In: Gomez S., Hennart JP. (eds) Advances in Optimization and Numerical Analysis. Mathematics and Its Applications, vol. 275. Springer, Dordrecht, pp. 1-2 (1994).
Motta, M., et al., "Low rank representations for quantum simulation of electronic structure", Computational Physics, Quantum Physics, arXiv:1808.02625v2, pp. 1-8 (Aug. 9, 2018).
Gokhale, P., et al., "Minimizing state preparations in variational quantum eigensolver by partitioning into commuting families", Quantum Physics, arXiv:1907.13623v1, pp. 1-23 (Jul. 31, 2019).
Huggins, W. J., et al., "Efficient and noise resilient measurements for quantum chemistry on near-term quantum computers", Quantum Physics, arXiv:1907.13117v3, pp. 1-10 (Sep. 23, 2019).
Bonet-Monroig, X., et al., "Nearly optimal measurement scheduling for partial tomography of quantum states", Quantum Physics, arXiv:1908.05628v2, pp. 1-9 (Sep. 6, 2019).
Examination Report mailed Dec. 22, 2021, in Canadian patent application No. 3,133,917, 5 pages.
Lemke, C., et al., "Metalearning: a survey of trends and technologies," Artificial Intelligence Review 44, 117 pp. 1-17 (2015).
T. Hospedales et al., "Meta-Learning in Neural Networks: A Survey," arXiv e-prints , arXiv:2004.05439, Nov. 7, 2020, 20 pages.
Mari, A., et al., "Estimating the gradient and higher-order derivatives on quantum hardware," Phys. Rev. A 103, 012405, pp. 1-17 (Feb. 26, 2021).
V. Bergholm et al., "Pennylane: Automatic differentiation of hybrid quantum-classical computations," arXiv preprint arXiv:1811.04968, Feb. 14, 2020, 15 pages.
Broughton, M., et al., "Tensorflow quantum: A software framework for quantum machine learning," arXiv preprint arXiv:2003.02989, pp. 1-56 (Aug. 26, 2021).
Brandao, F.G., et al., "For fixed control parameters the quantum approximate optimization algorithm's objective function value concentrates for typical instances," arXiv preprint arXiv:1812.04170, pp. 1-16 (2018).
Crooks, G.E., "Performance of the quantum approximate optimization algorithm on the maximum cut problem," arXiv preprint arXiv:1811.08419, pp. 1-6 (2018).
Zhou, L., et al., "Quantum approximate optimization algorithm: Performance, mechanism, and implementation on near-term devices," Phys. Rev. X 10, 021067 pp. 1-23 (2020).
Willsch, M., et al., "Benchmarking the quantum approximate optimization algorithm," Quantum Information Processing 19, 197, pp. 1-24 (2020).
T. Albash et al., "Adiabatic quantum computation," Rev. Mod. Phys. 90, 015002 (2018) 71 pages.
Lieb, E.H., and Wu, F.Y., "The one-dimensional Hubbard model: a reminiscence," Physica A: Statistical Mechanics and its Applications 321, 1, arXiv:0207529, pp. 1-33 (2002).
S. Sim et al., "Adaptive pruning-based optimization of parameterized quantum circuits," Quantum Science and Technology 10.1088/2058-9565/abe107 (2021) 24 pages, arXiv:2010.00629.
Kingma, D.P., and BA, J.L., "Adam: A method for stochastic optimization," arXiv preprint arXiv:1412.6980, pp. 1-15 (2014).
Cerezo, M., et al., "Cost function-dependent barren plateaus in shallow quantum neural networks," arXiv preprint arXiv:2001.00550, pp. 1-39 (Mar. 20, 2021).
Yosi Atia et al., "Fast-Forwarding of Hamiltonians and Exponentially Precise Measurements," Nature communications, 8(1) pp. 1-9, Nov. 17, 2017.
Ambainis, A., "On physical problems that are slightly more difficult than QMA," In 2014 IEEE 29th Conference on Computational Complexity (CCC), pp. 1-12 (2014).
Bravo-Prieto, C., et al., "Variational Quantum Linear Solver," Quantum Physics, arXiv: 1909.05820, pp. 1-21 (Sep. 12, 2019).
Shantanav Chakraborty et al., "The Power of Blockencoded Matrix Powers: Improved Regression Techniques Via Faster Hamiltonian Simulation," arXiv preprint arXiv:1804.01973, Sep. 3, 2018, 58 pages.
Yudong Cao et al., "Potential of Quantum Computing for Drug Discovery," IBM Journal of Research and Development, vol. 62, Issue 6, p. 6:1-6:20, Nov./Dec. 2018.
Sevag Gharibian et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv: 1909.05981, Sep. 12, 2019, 38 pages.
Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv: 1806.01838, Jun. 5, 2018, 67 pages.
Yimin Ge et al., "Faster Ground State Preparation and High-Precision Ground Energy Estimation with Fewer Qubits," Journal of Mathematical Physics, 60(2):022202, 2019. arXiv: 1712.03193, Feb. 2, 2018, 25 pages.
Sevag Gharibian et al., "The complexity of simulating local measurements on quantum systems," Quantum, 3:189, 2019. arXiv:1606.05626, Apr. 7, 2020, 38 pages.
Huang, H., et al., "Near-term quantum algorithms for linear systems of equations," arXiv preprint arXiv: 1909.07344, pp. 1-22 (Dec. 16, 2019).
Lin, L, and Tong, Y., "Near-optimal ground state preparation," Quantum, 4:372,arXiv:2002.12508, pp. 1-22 (Dec. 6, 2020).
Lin, L, and Tong, Y., "Heisenberg-limited ground state energy estimation for early fault-tolerant quantum computers," arXiv preprint arXiv:2102.11340, pp. 1-24 (Feb. 22, 2021).
Sam McArdle et al., "Digital quantum simulation of molecular vibrations," Chemical science, 10(22):5725-5735, 2019. arXiv: 1811.04069, Nov. 9, 2018, 14 pages.
Yigal Meir et al., "Landauer formula for the current through an interacting electron region," Physical review letters, 68(16): 2512, 1992, 5 pages.
Thomas E O'Brien et al., "Calculating energy derivatives for quantum chemistry on a quantum computer," NPJ Quantum Information, 5(1):1-12, 2019.
Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).
Rolando D Somma et al., "Spectral gap amplification," SIAM Journal on Computing, 42(2):593-610, 2013. arXiv: 1110.2494, Mar. 30, 2012, 14 pages.
Szabo, A. and Ostlund, N.S., "Modern quantum chemistry: introduction to advanced electronic structure theory," Courier Corporation, 2012. pp . 1-479 (2012).
Watson, J.D., et al., "The complexity of translationally invariant problems beyond ground state energies", arXiv preprint arXiv:2012.12717, pp. 1-58 (Dec. 23, 2020).
Yigit Subas et al., "Quantum algorithms for systems of linear equations inspired by adiabatic quantum computing," Physical review letters, 122(6): 060504, 2019. arXiv: 1805.10549, May 26, 2018, 9 pages.
Seeley, J.T., et al., "The Bravyi-Kitaev transformation for quantum computation of electronic structure," The Journal of chemical physics, 137(22):224109, 2012. arXiv: 1208.5986, pp. 1-38 (Aug. 29, 2012).

(56) References Cited

OTHER PUBLICATIONS

Rolando D Somma, "Quantum eigenvalue estimation via time series analysis," New Journal of Physics, 21(12):123025, 2019. arXiv:1907. 11748, Jul. 26, 2019, 10 pages.

Jordan, P., et al., "In The Collected Works of Eugene Paul Wigner: Part A: The Scientific Papers—Chapter: Über das Paulische Äquivalenzverbot", pp. 109-129. Springer (1993).

International Search Report and Written Opinion mailed Dec. 6, 2019 in PCT International Patent Application No. PCT/US2019/ 046895, 9 pages.

Bonet-Monroig, "Comparison of Error itigation Strategies in a Hydrogen Molecule Quantum Simulation", Master thesis. Leiden University, pp. 1-52 (May 29, 2018).

Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/ 1501.02813>.

Schlittgen, B., et al., "Low-Energy Effective Theories of Quantum Spin and Quantum Link Models", Physical Review D, vol. 63. No. 8, pp. 1-29 (Mar. 19, 2001).

Mcclean, J. R., et al., "The theory of variational hybrid quantum-classical algorithms", New Journal of Physics, vol. 18, pp. 1-22 (Feb. 5, 2016).

Romero et al., "Quantum autoencoders for efficient compression of quantum data", arXiv:1612.02806v2, Feb. 10, 2017, 11 pages . . . [retrieved on Jan. 20, 2020]. Retrieved from <https://arxiv.org/abs/ 1612.02806>.

Dallaire-Demers, P.L., et al., "Quantum Generative Adversarial Networks", Quantum Physics, Apr. 30, 2018, pp. 1-10.

Romero, J., et al., "Quantum autoencoders for efficient compression of quantum data", Quantum Science and Technology, vol. 2 (4):045001, Feb. 10, 2017, pp. 1-10.

Dallaire-Demers, P.L., et al., "Low-depth circuit ansatz for preparing correlated fermionic states on a quantum computer", Quantum Physics, arXiv:1801.01053v1 , pp. 1-15 (Jan. 3, 2018).

Romero, J., et al., "Strategies for quantum computing molecular energies using the unitary coupled cluster ansatz", arXiv: 1701. 02691v2 [quant-ph], vol. 4, No. 4, pp. 1-18 (Feb. 10, 2018).

Romero, J., and Aspuru-Guzik, A., "Variational quantum generators: Generative adversarial quantum machine learning for continuous distributions", Quantum Physics, arXiv:1901.00848 [quant-ph], pp. 1-15 (Jan. 3, 2019).

Reiher, M., et al., "Elucidating Reaction Mechanisms on Quantum Computers", PNAS, vol. 114, No. 29, pp. 1-28 (2016).

Rubin, N.C., "A Hybrid Classical/Quantum Approach for Large-Scale Studies of Quantum Systems with Density Matrix Embedding Theory", Quantum Physics, arXiv: 1610.06910 [quant-ph], pp. 1-10, (2016).

Decision to Grant mailed Jul. 19, 2022, in Taiwan patent application No. 109139876, 5 pages.

Examination Report mailed Aug. 24, 2022, in Canadian patent application No. 3,155,085, 4 pages.

Final Office Action mailed Aug. 25, 2022, in U.S. Appl. No. 16/543,165 of Peter D. Johnson, filed Aug. 16, 2019, 73 pages.

Frank Jensen, "Introduction to computational chemistry," John Wiley & Sons, Great Britain, 2017, 620 pages.

Non-Final Office Action mailed Aug. 3, 2022, in U.S. Appl. No. 16/900,947 of Guoming Wang, filed Jun. 14, 2020, 82 pages.

Second Examination Report mailed Aug. 2, 2022, in Canadian patent application No. 3,133,917, 3 pages.

* cited by examiner

NOISE MITIGATION THROUGH QUANTUM STATE PURIFICATION BY CLASSICAL ANSATZ TRAINING

BACKGROUND

Because of the effect of noise, the final state obtained after state preparation on a quantum computer could be a mixed state (i.e., an ensemble of pure states). The term "pure state" herein refers to a state that would be produced by a single wave function in a noiseless quantum computer. Any noisy quantum computer, however, will produce a state (referred to herein as a "mixed state") that is a mixture of the desired wave function and other, undesired, components. Many quantum algorithms, however, are designed such that the final answer of the algorithm is encoded in a pure state, or is an observable of such pure state.

SUMMARY

A computer-implemented method produces a representation of a pure quantum state from a classical model. The classical model has a plurality of parameters. The method includes: (A) selecting a set of outcomes from a library of outcomes of a quantum circuit, wherein the library of outcomes comprises a plurality of measurement pairs sampled from the quantum circuit, each measurement pair comprising a quantum measurement and a corresponding measurement basis; and (B) updating values of the plurality of parameters of the classical model to minimize a value of a distance measure between the classical model and the set of outcomes, thereby producing the updated classical model, wherein the updated classical model has the updated values of the plurality of parameters.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
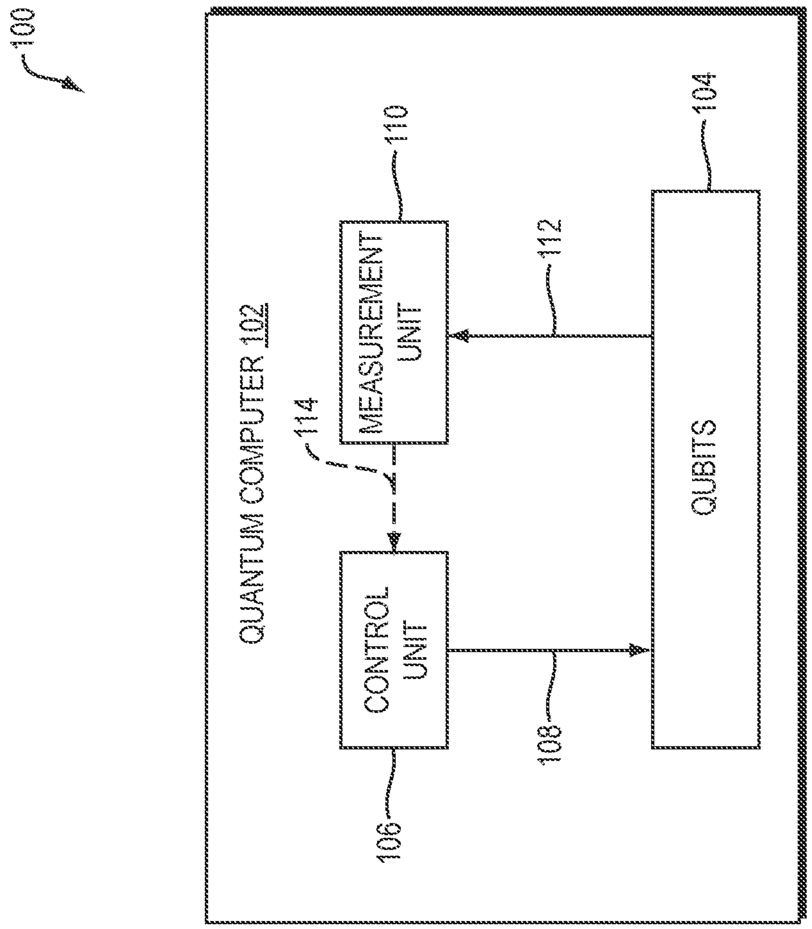
FIG. 1 is a diagram of a system implemented according to one embodiment of the present invention.

Because of the effect of noise, the final state obtained after state preparation on a quantum computer could be a mixed state (i.e., an ensemble of pure states). The term "pure state" herein refers to a state that would be produced by a single wave function in a noiseless quantum computer. Any noisy quantum computer, however, will produce a state (referred to herein as a "mixed state") that is a mixture of the desired wave function and other, undesired, components. Many quantum algorithms, however, are designed such that the final answer of the algorithm is encoded in a pure state, or is an observable of such pure state. Therefore, it is desirable to have a method to purify the mixed quantum state obtained from a noisy quantum computer, namely, to obtain the pure state that more closely approximates the state intended to be prepared, or that is more representative of the mixed state prepared on the quantum computer.

The representation generated by embodiments of the present invention may be implemented as a parameterized model stored on a classical computer, also referred to herein as a classical ansatz. This parametrized model (also referred to herein as the "classical model") may be designed such that it can only represent pure states. This may be achieved, for example, by choosing the classical model to be the equivalent of a function associating a single complex number to a given particle configuration. A particle configuration may be given, for example, as a set of real-space and/or spin coordinates, or as a set of orbital occupations. Note that such a classical model may act as an implicit or explicit map, depending on whether the classical model allows to directly compute a complex coefficient given a configuration, or whether the model requires an additional procedure (e.g., some neural network models, such as restricted Boltzmann machines (RBMs), would require extensive sampling to infer amplitudes to a given precision). In contrast, a classical model that maps a given particle configuration to several complex numbers with different probabilities would not represent a pure state.

Additional symmetry properties may be built-in into the classical model, such as it reflects better the properties of the quantum state that is intended to be prepared on the quantum device. Examples of such models include Artificial Neural Networks (ANN), such as restricted Boltzmann Machines (RBM), and tensor network models, such as Matrix Product states (MPS). As an alternative or a complement to building symmetry properties inside the model, specific symmetries may be imposed as a post-processing step after sampling from the model, or included as penalty terms in the cost function while training the model.

Embodiments of the present invention need not perform full state tomography, which is an extremely time-consuming and resource intensive task, but instead may obtain enough information about a state to perform a specific task. For example, quantum chemistry embodiments of the present invention may require only the 2-body part of the wavefunction to be correct. Thus, even if the true state of interest prepared on the quantum computer is exponentially complex, the classical model might be able to represent accurately a polynomially complex, k-body partial trace of the ground state of interest. Moreover, embodiments of the present may use a mixed quantum state to generate a purified representation. Since the target state of most quantum computations is a pure state, the quantum computer alone will be limited by gate and state preparation error, which is ubiquitous on today's noisy quantum computers. Previous techniques utilizing classical models have only focused on reducing the number of necessary measurements to reconstruct an approximation of the quantum state. Hence, embodiments of the present invention seek to reduce the effect of noisy processes happening on the quantum device itself, whereas previous techniques only sought to reduce the effect of statistical noise from the sampling process.

Figure 4:
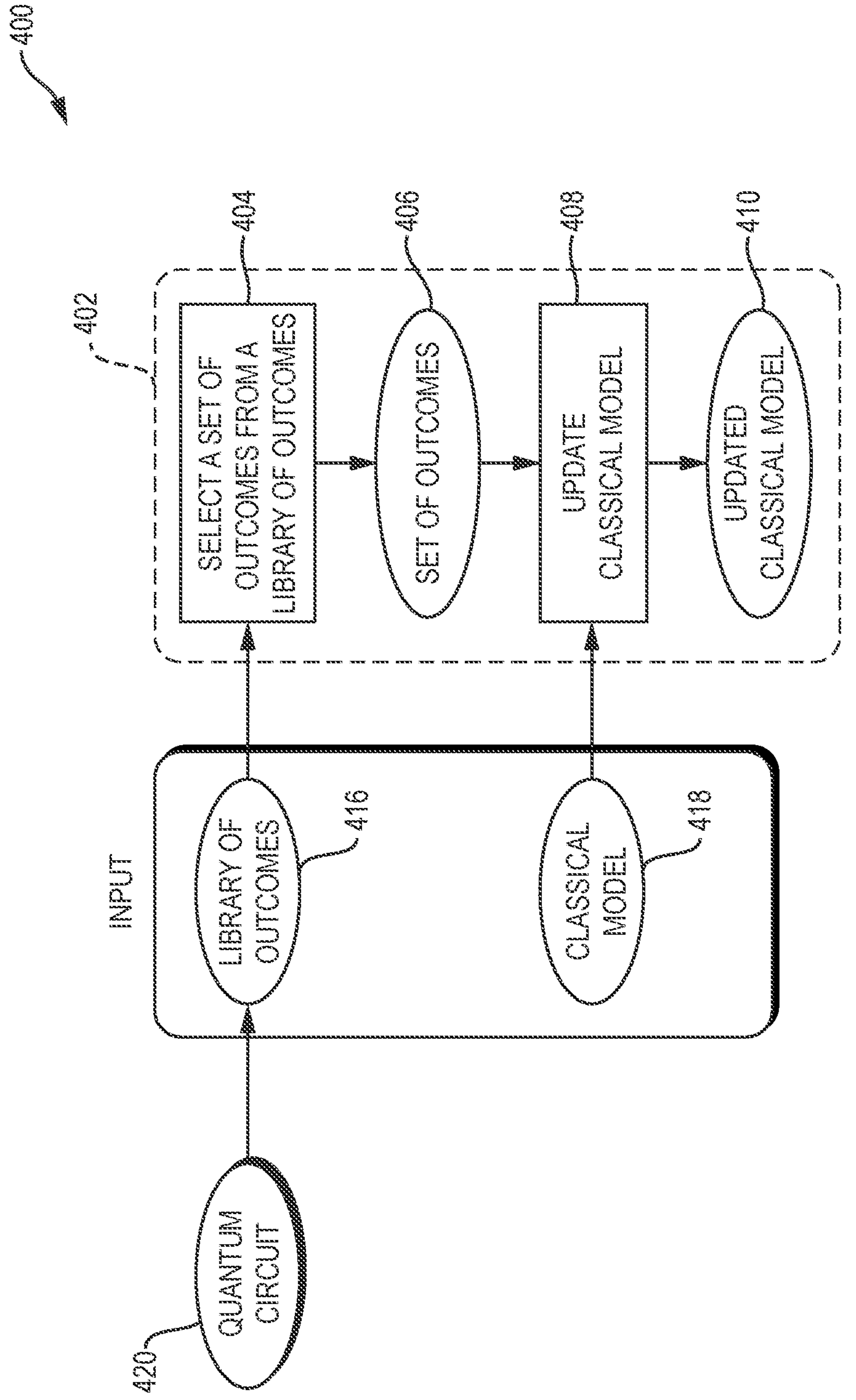
FIG. 4 is a flowchart of a method performed by embodiments of the present invention to train parameters of a classical model according to embodiment of the present invention.

Referring to FIG. 4, a flowchart is shown of a method 400 performed by embodiments of the present invention to train parameters of a classical model 418 according to one embodiment of the present invention. The method 400 produces a representation of a pure quantum state from the classical model 418. The classical model 418 includes a plurality of parameters.

The method 400 of FIG. 4 uses the data generated from preparation and measurement of a quantum circuit 420 on a quantum computer and measures its output a suitable number of times and records the results of the measurements into a library of measurement outcomes 416. The method 400 may or may not perform the preparation and measurement of the quantum circuit 420. For example, the quantum circuit 420 may be prepared and/or measured outside of the method 400. Each such measurement result may include both a quantum measurement and the corresponding basis in which the quantum measurement was measured, referred to herein as a "measurement pair." This plurality of measurement pairs is referred to herein as a library of outcomes 416.

The method 400 selects a set of outcomes 406 from the library of outcomes 416 of the quantum circuit 420 (FIG. 4, operation 404). As described above, the library of outcomes 416 includes a plurality of measurement pairs sampled from the quantum circuit 420, wherein each measurement pair includes a quantum measurement and a corresponding measurement basis.

The method 400 updates values of the plurality of parameters of the classical model 418 to minimize a value of a distance measure between the classical model 418 and the set of outcomes 406, thereby producing an updated classical model 410 (FIG. 4, operation 408). The updated classical model 410 has the updated values of the plurality of parameters.

The method 400 may repeat operations 404 and 408 until the parameters of the classical ansatz converge based on a halting criterion, which may, for example, be based on success or on convergence.

Since the classical model 418 can only represent pure states, the metric minimization used by the method 400 of FIG. 4 to optimize the parameters of the classical model 418 has the side effect of producing the pure state accessible by the classical model 418 that is closest to the state prepared on the quantum computer. (A pure state is "accessible by" the classical model 418 if the classical model 418 may represent the pure state.) The resulting updated classical model 410 with its converged parameters may be stored on the classical computer. The updated classical model 410 may then be sampled sufficiently many times to produce the desired statistics which embody the representation of the pure quantum state. For example, an answer encoded in the state or an observable of interest may be computed by the classical computer by performing suitable operations on the classical representation, such as by measuring expectation values of operators on the classical representation.

Note that the prepared target quantum state on the quantum computer may be a mixed state. The state preparation may, for example, be achieved by the execution of a quantum circuit or the natural evolution of the system. Measurements may be performed in one or multiple measurement bases. Such bases may be chosen according to any of a variety of criteria. In algorithms where the goal is to prepare a quantum state that extremizes the value of an observable (e.g. VQE), the basis or set of bases may correspond to the Pauli bases of the observable that is extremized.

In some cases, more general measurement bases can be advantageous, for example those corresponding to multi-qubit transformations that can be efficiently implemented on a quantum system and represented classically. Examples are single-particle transformations like the orbital frames method in the case of fermionic systems. Samples can be drawn from the quantum states in the orbital frames bases using known techniques, as disclosed, for example, in application Ser. No. 16/740,177, filed on Jan. 20, 2020, entitled, "Measurement Reduction Via Orbital Frames Decompositions On Quantum Computers," which is hereby incorporated by reference herein.

In some cases, the classical model can only perform sampling in a single basis. To train the classical model, embodiments of the present invention may transform the outcomes of the classical model to the bases actually measured on the quantum device. This can be an important criterion in choosing measurement bases if the transformation is to be efficient. For example, both Pauli bases and orbital frames can be applied index-wise to the measurement bitstrings, thus avoiding the general, exponentially-sized basis transformation unitary matrix.

Postprocessing of the measurements may be applied to enforce additional properties on the classical pure state learned, for example, by omitting, from the set of outcomes 406, measurement pairs that violate one or more symmetry conditions. Examples of additional properties are pure state conditions specific to certain types of system (e.g., Fermionic pure state conditions), and total number of particles or spin. In general, any error mitigation technique that can be applied to individual measurements may be used. In addition to symmetry conditions, other methods based on device calibration data may be used; for example, readout corrections or probabilistic corrections may be used. In the case of fermionic simulations, measuring in the orbital frames bases allows embodiments of the present invention to check that the number of particles is correct in every individual measurement.

Additionally, the updated classical model may be further optimized according to a different cost function. This cost function depends on the original goal of preparing the quantum state on the quantum computer. In the case of electronic structure simulations, the cost function may be the total energy of the system. The parameters of the classical model may then be varied to minimize this energy according to the variational principle. Additional symmetries may be enforced on the classical model by design, or, for example, by including penalty terms into the cost function. The effect of the previous training of the classical model is effectively to provide a high-quality initialization for further optimization.

One embodiment of the present invention is directed to method for producing a representation of a pure quantum state from a classical model. The classical model has a plurality of parameters. The method is performed by at least one processor executing computer program instructions stored in at least one non-transitory computer-readable medium. The method includes: (A) selecting a set of outcomes from a library of outcomes of a quantum circuit, wherein the library of outcomes comprises a plurality of measurement pairs sampled from the quantum circuit, each measurement pair comprising a quantum measurement and a corresponding measurement basis; and (B) updating values of the plurality of parameters of the classical model to minimize a value of a distance measure between the classical model and the set of outcomes, thereby producing the updated classical model, wherein the updated classical model has the updated values of the plurality of parameters.

The method may further include: (C) before (A), performing a sequence of measurements on the quantum circuit to produce the library of outcomes of the quantum circuit.

Selecting the set of outcomes may include selecting, as the set of outcomes, every measurement pair in the library of outcomes. Selecting the set of outcomes may include omitting, from the set of outcomes, measurement pairs that violate one or more symmetry conditions. The symmetry conditions may, for example, include pure state conditions of the classical model. Omitting the measurement pairs may include omitting, from the set of outcomes, all measurement pairs in the plurality of measurement pairs that violate the one or more symmetry conditions. Selecting the set of outcomes may include selecting, as the set of outcomes, every measurement pair in the library of outcomes, except for all measurement pairs in the plurality of measurement pairs that violate the one or more symmetry conditions.

The method may further include: (C) after (B), repeating (A) and (B) until the distance measure between the updated classical model and the set of outcomes reaches a convergence criterion. The halting criterion may include halting once the distance measure between the classical model and the set of outcomes falls below a threshold value. Selecting the set of outcomes may include selecting a particular set of outcomes from the library of outcomes, and repeating (A) may include, in each repetition of (A), selecting the particular set of outcomes.

The method may further include: (C) after (B), sampling the updated classical model to produce a set of classical outcomes. The method may further include: (D) after (C), using the set of classical outcomes to compute a function of the representation of the pure quantum state.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
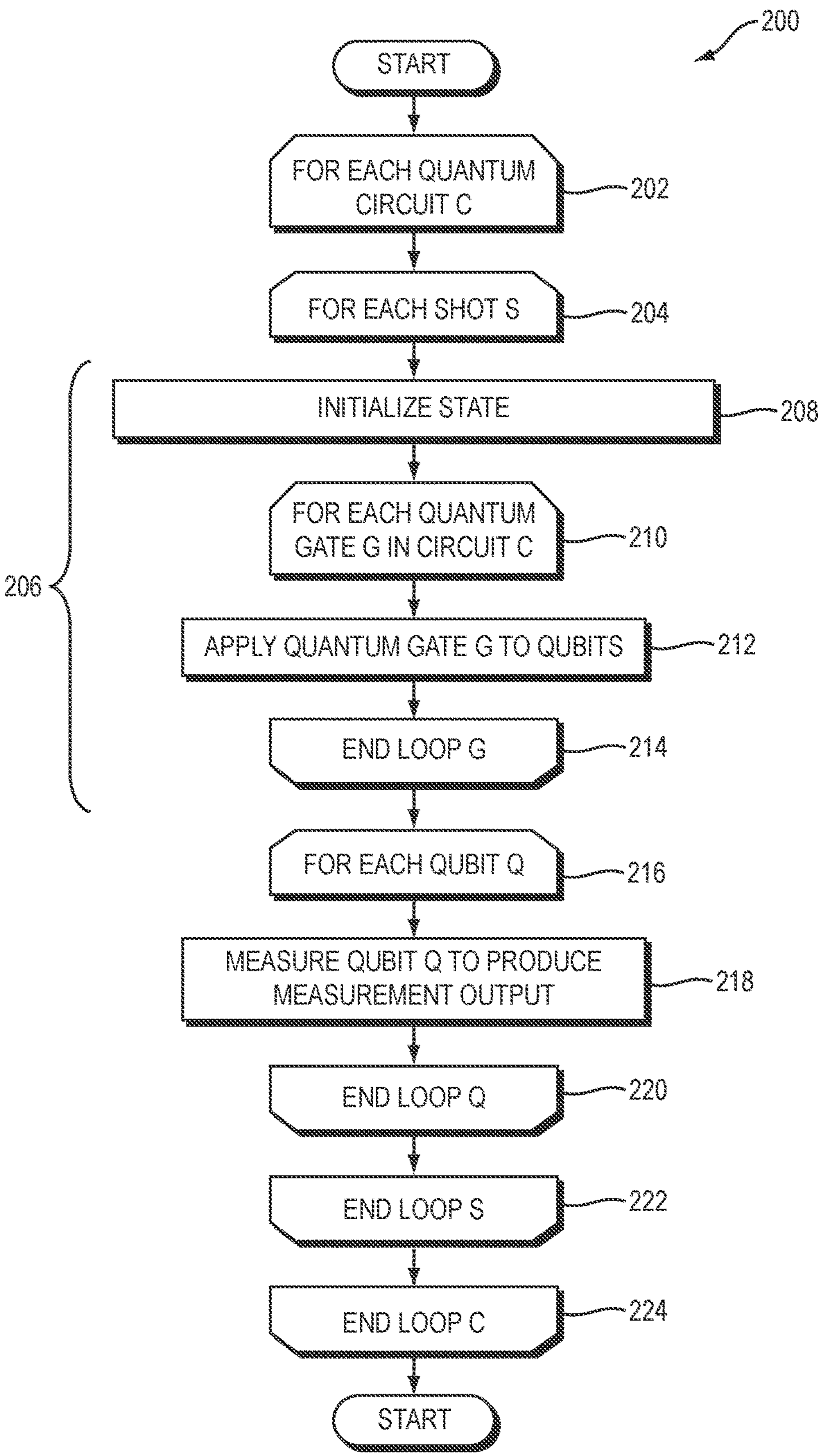
FIG. 2A is a flow chart of a method performed by the system of FIG. 1 according to one embodiment of the present invention.
Figure 2B:
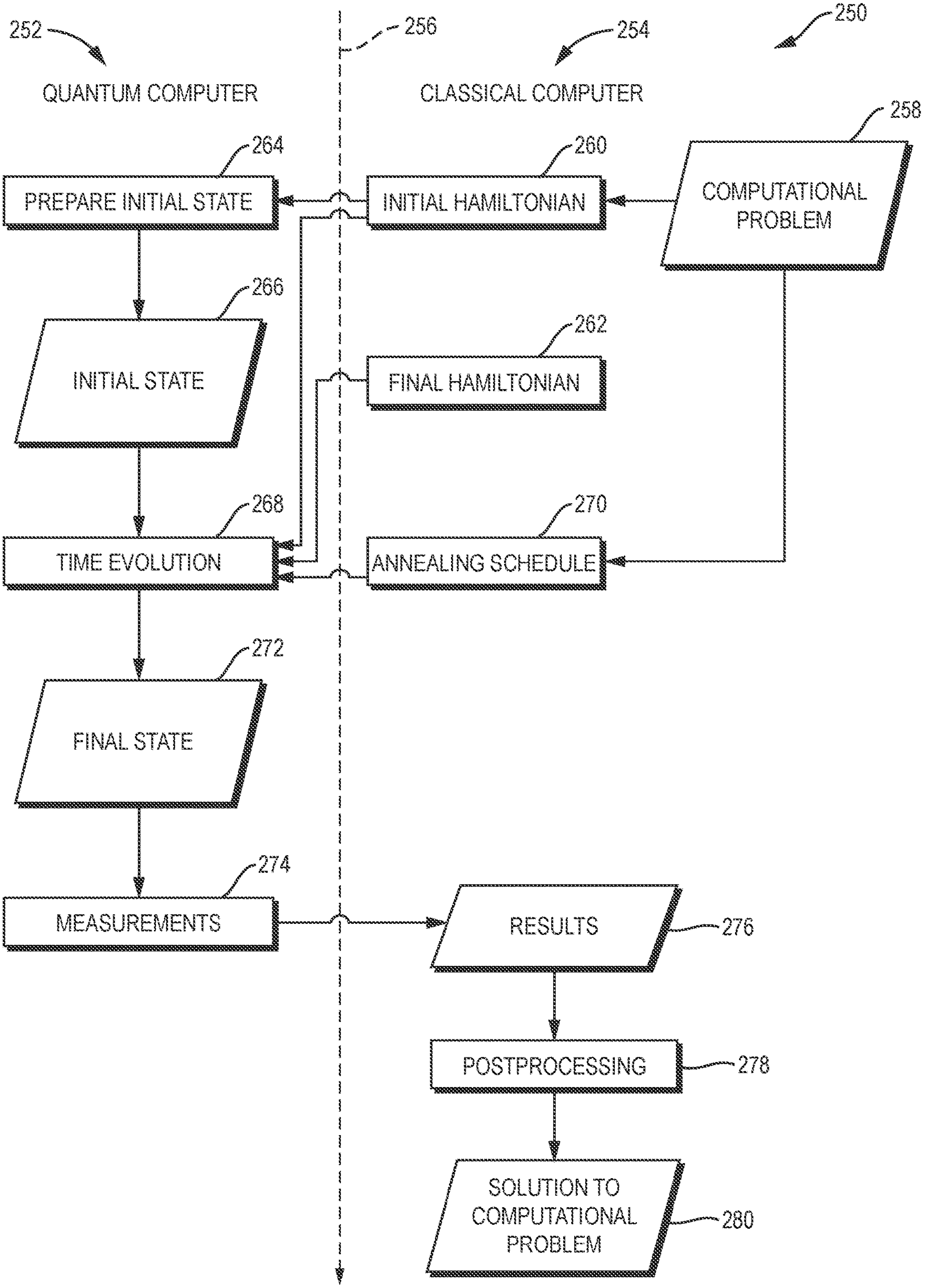
FIG. 2B is a diagram illustrating operations typically performed by a computer system which implements quantum annealing.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 254 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 104. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments, the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

- In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.
- In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.
- In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.
- In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.
- In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback 114 from the measurement unit 110 to the control unit 106. Such feedback 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. W and X as elements of "state preparation" may instead be characterized as elements of gate application. Conversely, for example, some or all of the components and operations that are illustrated in FIGS. W and X as elements of "gate application" may instead be characterized as elements of state preparation. As one particular example, the system and method of FIGS. W and X may be characterized as solely performing state preparation followed by measurement, without any gate application, where the elements that are described herein as being part of gate application are instead considered to be part of state preparation. Conversely, for example, the system and method of FIGS. W and X may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG.

2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
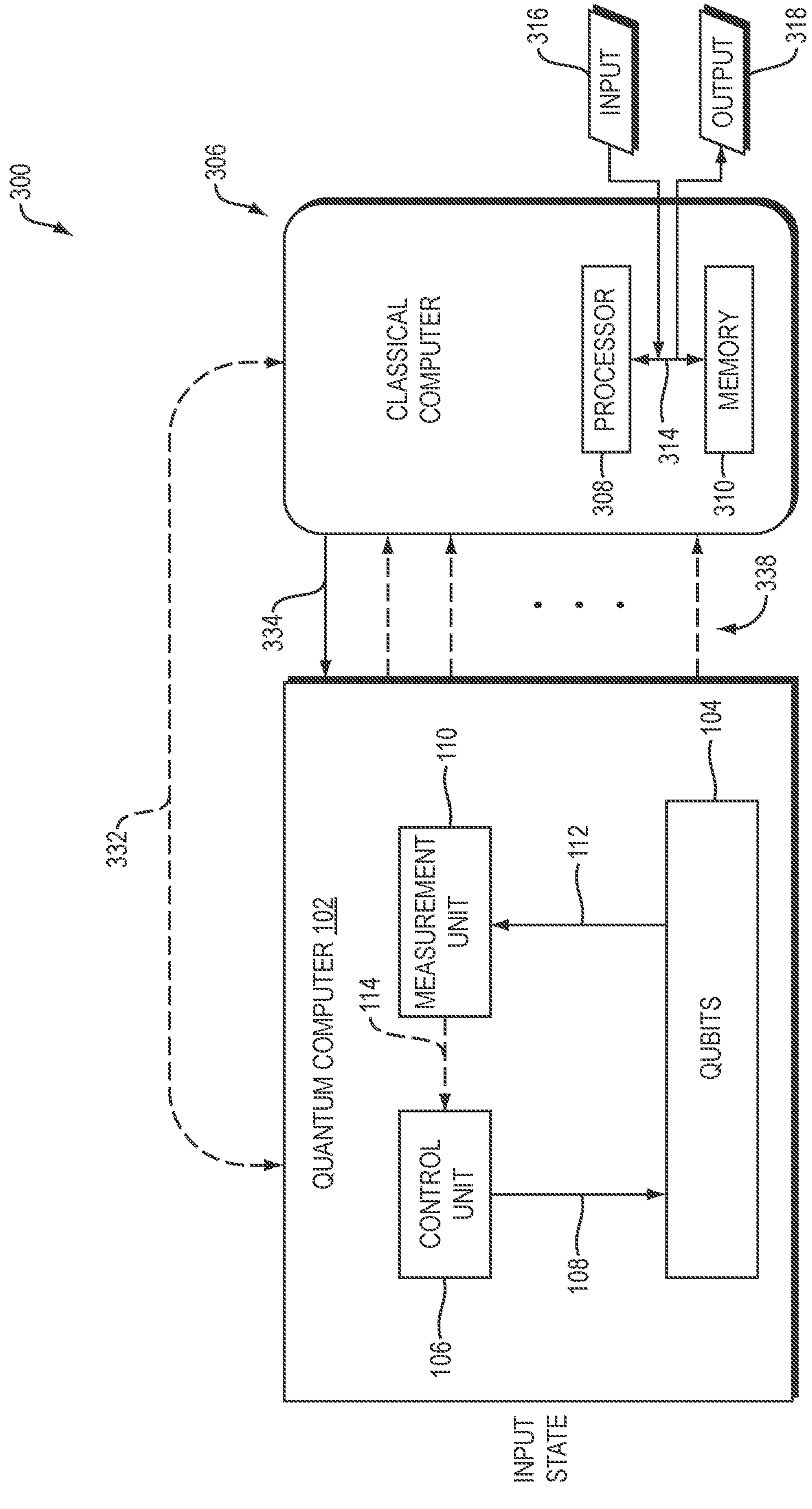
FIG. 3 is a diagram of a hybrid quantum-classical computer system implemented according to one embodiment of the present invention.

Referring to FIG. 3, a diagram is shown of a hybrid classical quantum computer (HQC) 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. W and X) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid classical quantum (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the number of measurements required to sample, to sufficient accuracy, a quantum state with only twenty qubits could require billions of samples to rectify. Embodiments of the present invention may be applied to a quantum state of any size, such as a quantum state with twenty or more qubits (e.g., 30 or more qubits, 40 or more qubits, 50 or more qubits, or 100 or more qubits). Hence, as performed by embodiments of the present invention, is not possible for a human to perform mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for producing a representation of a pure quantum state from a classical model, the classical model having a plurality of parameters, the method performed by at least one processor executing computer program instructions stored in at least one non-transitory computer-readable medium, the method comprising:

(A) selecting a set of outcomes from a library of outcomes of a quantum circuit, wherein the library of outcomes comprises a plurality of measurement pairs sampled from the quantum circuit, each measurement pair comprising a quantum measurement and a corresponding measurement basis;

(B) updating values of the plurality of parameters of the classical model to minimize a value of a distance measure between the classical model and the set of outcomes, thereby producing the updated classical model, wherein the updated classical model has the updated values of the plurality of parameters, and wherein the distance measure quantifies a distance between a first state represented by the classical model and a second state represented by the set of outcomes.

2. The method of claim 1, further comprising:

(C) before (A), performing a sequence of measurements on the quantum circuit to produce the library of outcomes of the quantum circuit.

3. The method of claim 1, wherein selecting the set of outcomes comprises selecting, as the set of outcomes, every measurement pair in the library of outcomes.

4. The method of claim 1, wherein selecting the set of outcomes comprises omitting, from the set of outcomes, measurement pairs that violate one or more symmetry conditions.

5. The method of claim 4, wherein the symmetry conditions comprise pure state conditions of the classical model.

6. The method of claim 4, wherein omitting, from the set of outcomes, measurement pairs that violate one or more symmetry conditions comprises omitting, from the set of outcomes, all measurement pairs in the plurality of measurement pairs that violate the one or more symmetry conditions.

7. The method of claim 6, wherein selecting the set of outcomes comprises selecting, as the set of outcomes, every measurement pair in the library of outcomes, except for all measurement pairs in the plurality of measurement pairs that violate the one or more symmetry conditions.

8. The method of claim 1, further comprising:

(C) after (B), repeating (A) and (B) until the distance measure between the updated classical model and the set of outcomes reaches a convergence criterion.

9. The method of claim 8 wherein the convergence criterion comprises halting once the distance measure between the classical model and the set of outcomes falls below a threshold value.

10. The method of claim 8, wherein selecting the set of outcomes comprises selecting a particular set of outcomes from the library of outcomes, and wherein repeating (A) comprises, in each repetition of (A), selecting the particular set of outcomes.

11. The method of claim 8, further comprising:

(D) after (B), sampling the updated classical model to produce a set of classical outcomes.

12. The method of claim 11, further comprising:

(E) after (C), using the set of classical outcomes to compute a function of the representation of the pure quantum state.

13. The method of claim 1, further comprising:

(C) after (B), sampling the updated classical model to produce a set of classical outcomes.

14. A system for producing a representation of a pure quantum state from a classical model, the classical model having a plurality of parameters, the system comprising at least one non-transitory computer-readable medium storing computer program instructions, the computer program instructions being executable by at least one processor to perform a method, the method comprising:

(A) selecting a set of outcomes from a library of outcomes of a quantum circuit, wherein the library of outcomes comprises a plurality of measurement pairs sampled from the quantum circuit, each measurement pair comprising a quantum measurement and a corresponding measurement basis;

(B) updating values of the plurality of parameters of the classical model to minimize a value of a distance measure between the classical model and the set of outcomes, thereby producing the updated classical model, wherein the updated classical model has the updated values of the plurality of parameters, and wherein the distance measure quantifies a distance between a first state represented by the classical model and a second state represented by the set of outcomes.

15. The system of claim 14, wherein the method further comprises:

(C) before (A), performing a sequence of measurements on the quantum circuit to produce the library of outcomes of the quantum circuit.

16. The system of claim 14, wherein selecting the set of outcomes comprises selecting, as the set of outcomes, every measurement pair in the library of outcomes.

17. The system of claim 14, wherein selecting the set of outcomes comprises omitting, from the set of outcomes, measurement pairs that violate one or more symmetry conditions.

18. The system of claim 17, wherein the symmetry conditions comprise pure state conditions of the classical model.

19. The system of claim 17, wherein omitting, from the set of outcomes, measurement pairs that violate one or more symmetry conditions comprises omitting, from the set of outcomes, all measurement pairs in the plurality of measurement pairs that violate the one or more symmetry conditions.

20. The system of claim 19, wherein selecting the set of outcomes comprises selecting, as the set of outcomes, every measurement pair in the library of outcomes, except for all measurement pairs in the plurality of measurement pairs that violate the one or more symmetry conditions.

21. The system of claim 14, wherein the method further comprises:

(C) after (B), repeating (A) and (B) until the distance measure between the updated classical model and the set of outcomes reaches a convergence criterion.

22. The system of claim 21 wherein the convergence criterion comprises halting once the distance measure between the classical model and the set of outcomes falls below a threshold value.

23. The system of claim 21, wherein selecting the set of outcomes comprises selecting a particular set of outcomes from the library of outcomes, and wherein repeating (A) comprises, in each repetition of (A), selecting the particular set of outcomes.

24. The system of claim 21, wherein the method further comprises:

(D) after (B), sampling the updated classical model to produce a set of classical outcomes.

25. The system of claim 24, wherein the method further comprises:

(E) after (C), using the set of classical outcomes to compute a function of the representation of the pure quantum state.

26. The system of claim 14, wherein the method further comprises:

(C) after (B), sampling the updated classical model to produce a set of classical outcomes.

* * * * *